United States Patent
Nakao et al.

(10) Patent No.: US 11,264,892 B2
(45) Date of Patent: Mar. 1, 2022

(54) POWER-SUPPLY APPARATUS AND POWER-SUPPLY METHOD

(71) Applicant: FUJITSU LIMITED, Kawasaki (JP)

(72) Inventors: Hiroshi Nakao, Yamato (JP); Yu Yonezawa, Sagamihara (JP); Yoshiyasu Nakashima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 272 days.

(21) Appl. No.: 16/137,597

(22) Filed: Sep. 21, 2018

(65) Prior Publication Data

US 2019/0097525 A1    Mar. 28, 2019

(30) Foreign Application Priority Data

Sep. 27, 2017    (JP) .............................. JP2017-186575

(51) Int. Cl.
*H02M 1/36*    (2007.01)
*H02H 1/00*    (2006.01)
(Continued)

(52) U.S. Cl.
CPC ............ *H02M 1/36* (2013.01); *H02H 1/0007* (2013.01); *H02M 1/08* (2013.01);
(Continued)

(58) Field of Classification Search
CPC ...... H02M 1/36; H02M 1/08; H02M 3/33507; H02M 3/33515; H02M 3/33523; H02H 1/0092; H02H 1/0007
See application file for complete search history.

(56) References Cited

U.S. PATENT DOCUMENTS

| 8,179,114 B2 * | 5/2012 | Hirahara | H02M 3/1588 |
| | | | 323/285 |
| 8,253,397 B2 * | 8/2012 | Collins | H02M 3/156 |
| | | | 323/271 |

(Continued)

FOREIGN PATENT DOCUMENTS

| EP | 2424099 A1 * | 2/2012 | ............ H02M 3/157 |
| JP | 2009213246 A * | 9/2009 | ................ B60L 3/04 |
| JP | 2017-085820 | 5/2017 | |

OTHER PUBLICATIONS

Japanese Office Action dated Apr. 20, 2021 for corresponding Japanese Patent Application No. 2017-186575, with English Translation, 8 pages.

*Primary Examiner* — Gustavo A Rosario-Benitez
(74) *Attorney, Agent, or Firm* — Fujitsu Patent Center

(57) ABSTRACT

A power-supply apparatus includes a power-supply circuit to which an input voltage and an input current are input, to include a switching element to be controlled by a control signal so as to generate an output voltage and an output current, a memory, and a processor coupled to the memory and the processor to calculate a first duty ratio of the control signal so that the output voltage approaches a target voltage, calculate a second duty ratio of the control signal for the switching element, based on the input voltage, the input current, the output voltage, and the output current, detect deterioration of the power-supply circuit, based on the first duty ratio and the second duty ratio, generate the control signal of the first duty ratio when the power-supply circuit has not deteriorated, and generate the control signal for stopping the power-supply circuit when the power-supply circuit has deteriorated.

18 Claims, 13 Drawing Sheets

(51) Int. Cl.
*H02M 3/335* (2006.01)
*H02M 1/08* (2006.01)
*H02M 1/00* (2006.01)

(52) U.S. Cl.
CPC ... *H02M 3/33507* (2013.01); *H02M 3/33515* (2013.01); *H02M 1/0009* (2021.05)

(56) References Cited

U.S. PATENT DOCUMENTS

| | | | |
|---|---|---|---|
| 10,320,294 B2 * | 6/2019 | Jiang | H02M 7/537 |
| 2003/0086718 A1 * | 5/2003 | Birumachi | G03G 15/2003 399/67 |
| 2005/0197791 A1 * | 9/2005 | Matsumoto | H02M 3/33523 702/60 |
| 2007/0291198 A1 * | 12/2007 | Shen | G09G 3/3413 349/69 |
| 2010/0250223 A1 * | 9/2010 | Hagishima | G06F 30/367 703/14 |
| 2011/0062870 A1 * | 3/2011 | Kanbara | H05B 45/37 315/77 |
| 2014/0167523 A1 * | 6/2014 | Tamaki | H02J 7/0029 307/104 |
| 2015/0023068 A1 * | 1/2015 | Uno | H02M 3/33515 363/21.13 |
| 2015/0145574 A1 * | 5/2015 | Fujiwara | H02M 1/08 327/175 |
| 2015/0311787 A1 * | 10/2015 | Maede | H02M 3/156 323/271 |
| 2015/0318685 A1 * | 11/2015 | Hsieh | H02H 7/20 363/53 |
| 2016/0006347 A1 * | 1/2016 | Matsui | H02M 3/04 323/304 |
| 2017/0126135 A1 | 5/2017 | Sugawara et al. | |
| 2018/0323699 A1 * | 11/2018 | Carpenter, Jr | G05B 15/02 |

* cited by examiner

FIG. 2A

| Iout [A] | Rloss [Ω] |
|---|---|
| 0.1 | 10 |
| 1 | 1.8 |
| 2 | 0.7 |
| ... | ... |
| 42 | 0.12 |

| Iout [A] | Da/Dt | Vout [V] | Vin [V] | Iin [A] |
|---|---|---|---|---|
| 2 | 1 | 12.1 | 380 | 0.04 |
| ... | ... | ... | ... | ... |
| 10 | 1.05 | 12.0 | 380 | 0.073 |
| ... | ... | ... | ... | ... |
| 30 | 1.10 | 12.0 | 380 | 1.00 |

| CONSTITUENT COMPONENT | DETERIORATION FACTOR | N/A | Da/Dt | | Iout |
|---|---|---|---|---|---|
| | | | PROMINENT AT HIGH OUTPUT SIDE (RESISTANCE LOSS) | PROMINENT AT LOW OUTPUT SIDE FIXED LOSS, (SWITCHING LOSS) | |
| PHOTOCOUPLER | CURRENT DETECTION CIRCUIT SENSITIVITY DECREASE | | | | CONSTANT | ~801
| | VOLTAGE DETECTION CIRCUIT SENSITIVITY DECREASE | ✓ | | | CONSTANT | ~802
| SEMICONDUCTOR | ON-RESISTANCE INCREASE | | ✓ | | INCREASE | ~803
| | SPEED DECREASE | | | ✓ | INCREASE | ~804
| | INSULATION DETERIORATION | | | ✓ | INCREASE | ~805
| | LOSS RESISTANCE INCREASE | | ✓ | | INCREASE | ~806
| CAPACITOR | CAPACITANCE DECREASE | | ✓ | | INCREASE | ~807
| | INSULATION DECREASE | | | ✓ | INCREASE | ~808
| SUBSTRATE | RESISTANCE INCREASE | | ✓ | | INCREASE | ~809
| | INSULATION DETERIORATION | | | ✓ | INCREASE | ~810

FIG. 9

| Factor | Amount of change in gain or loss | | Da/Dt | |
|---|---|---|---|---|
| | Warning threshold [%] | Stop threshold [%] | Warning threshold [%] | Stop threshold [%] |
| 901 Voltage detection circuit sensitivity decrease | >3 | >5 | >103 | >105 |
| 902 Fixed loss power (standby power) increase | >25 | >50 | >103 | >105 |
| 903 Resistance loss power increase | >10 | >20 | >108 | >115 |
| 904 Current detection circuit sensitivity decrease | >20 | >40 | — | — |

FIG. 13

| FACTOR | AMOUNT OF DETERMINATION | WARNING THRESHOLD | STOP THRESHOLD |
|---|---|---|---|
| 901 — VOLTAGE DETECTION CIRCUIT SENSITIVITY DECREASE | Da/Dt | > 103% | > 105% |
| 902 — FIXED LOSS POWER (STANDBY POWER) INCREASE | GRADIENT OF Da/Dt WITH RESPECT TO Iout | > −0.1 | > −0.2 |
| 903 — RESISTANCE LOSS POWER INCREASE | GRADIENT OF Da/Dt WITH RESPECT TO Iout | > 0.2 | > 0.4 |
| 904 — CURRENT DETECTION CIRCUIT SENSITIVITY DECREASE | GRADIENT OF Da/Dt WITH RESPECT TO Iout | — | — |

POWER-SUPPLY APPARATUS AND POWER-SUPPLY METHOD

CROSS-REFERENCE TO RELATED APPLICATION

This application is based upon and claims the benefit of priority of the prior Japanese Patent Application No. 2017-186575, filed on Sep. 27, 2017, the entire contents of which are incorporated herein by reference.

FIELD

The embodiments discussed herein are related to a power-supply apparatus and a power-supply method.

BACKGROUND

A power-supply apparatus has been known that has a duty-ratio determiner that determines a duty ratio of a control signal for a switching element in a power supply circuit so that an output voltage of the power supply circuit gets close to a target voltage (see Japanese Laid-open Patent Publication No. 2017-085820). A permissible-range calculator calculates a permissible range of the duty ratio, based on a current output from the power supply circuit and detected by a current detection circuit. When the duty ratio determined by the duty-ratio determiner is within the permissible range, an output portion outputs the duty ratio determined by the duty-ratio determiner, and when the duty ratio determined by the duty-ratio determiner is outside the permissible range, the output portion causes the power supply circuit to stop. Thus, in the power-supply apparatus, even when the current detection circuit fails, the power supply circuit can be stopped when overcurrent flows to the power supply circuit.

SUMMARY

According to an aspect of the invention, a power-supply apparatus includes a power supply circuit to which an input voltage and an input current are input, configured to include a switching element to be controlled by a control signal so as to generate an output voltage and an output current, a memory, and a processor coupled to the memory and the processor configured to calculate a first duty ratio of the control signal so that the output voltage approaches a target voltage, calculate a second duty ratio of the control signal for the switching element, based on the input voltage, the input current, the output voltage, and the output current, detect deterioration of the power supply circuit, based on the first duty ratio and the second duty ratio, generate the control signal of the first duty ratio when the power supply circuit has not deteriorated, and generate the control signal for stopping the power supply circuit when the power supply circuit has deteriorated.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2A illustrates an example of a data table, and FIG. 2B illustrates an example of a work memory;

FIG. 8 is a table illustrating major deterioration factors of a power supply circuit;

FIG. 9 is a table illustrating examples of a warning threshold and a stop threshold for each deterioration factor;

FIG. 13 is a table illustrating a processing method for a deterioration detector according to another embodiment.

DESCRIPTION OF EMBODIMENTS

Embodiments of a technology that makes it possible to detect deterioration of a power supply circuit including a current detection circuit in a power-supply apparatus will be described below with reference to the accompanying drawings.

Figure 1:
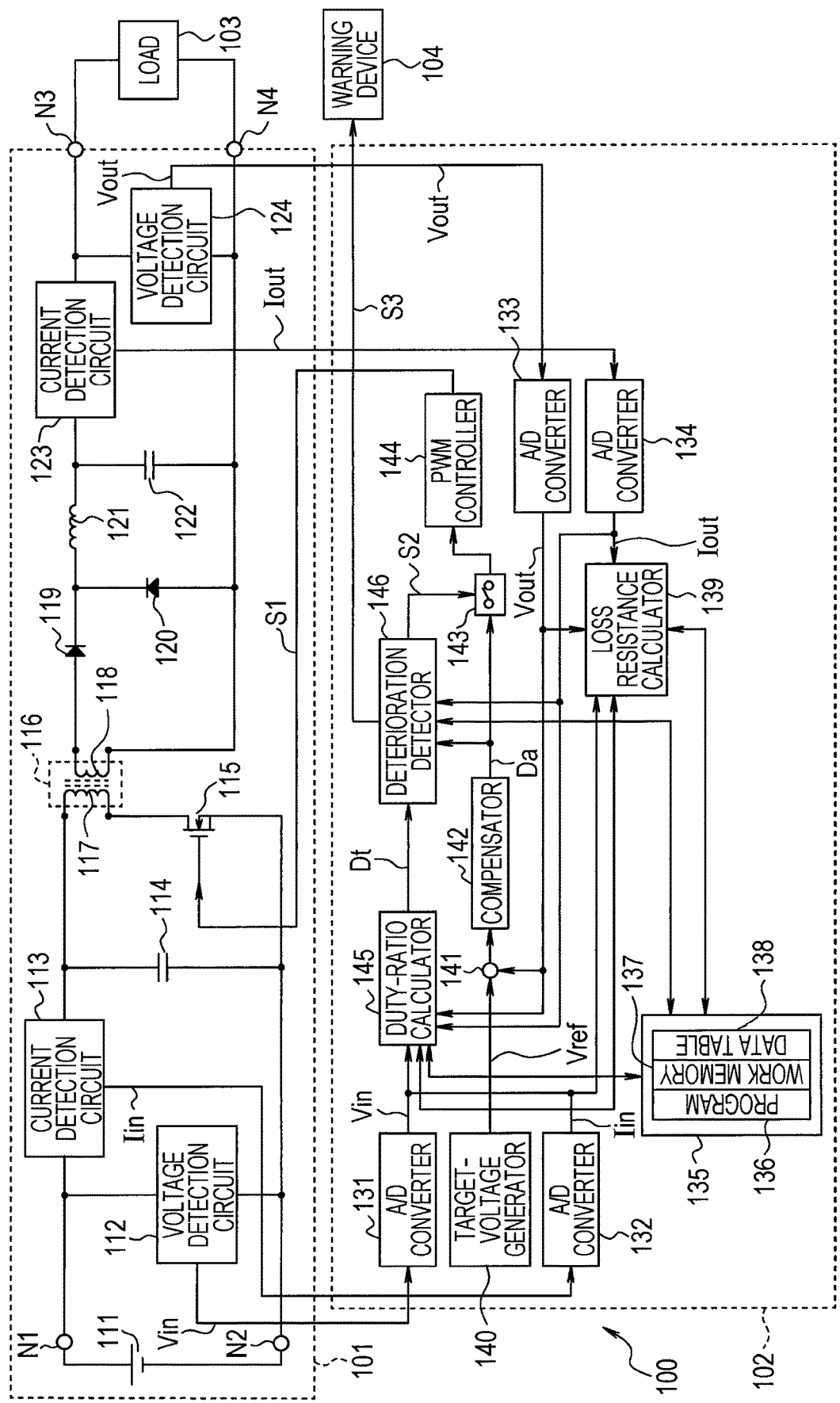
FIG. 1 is a diagram illustrating an example configuration of a power-supply apparatus according to an embodiment.

FIG. 1 is a diagram illustrating an example configuration of a power-supply apparatus 100 according to an embodiment. The power-supply apparatus 100 includes a power supply circuit 101, a control device 102, a load 103, and a warning device 104. The power supply circuit 101 includes a direct-current power supply 111, a voltage detection circuit 112, a current detection circuit 113, an electrolytic capacitor 114, an n-channel field-effect transistor 115, a transformer 116, diodes 119 and 120, an inductor 121, an electrolytic capacitor 122, a current detection circuit 123, and a voltage detection circuit 124. The transformer 116 has a primary winding 117 and a secondary winding 118. The field-effect transistor 115 is preferably a gallium-nitride high-electron-mobility transistor (GaN HEMT) but may be a metal-oxide-semiconductor field-effect transistor (MOSFET). The HEMT has advantages in high-voltage resistance and high-speed switching. For example, a 380 V direct-current input voltage Vin is input to the power supply circuit 101 via the direct-current power supply 111, and the power supply circuit 101 reduces the direct-current voltage Vin and outputs, for example, a 12 V direct-current output voltage Vout to the load 103. The load 103 is a server apparatus, electronic equipment, or the like. The turns ratio of the primary winding 117 versus the secondary winding 118 is α:1. For a high-voltage power supply, typically, α takes a value larger than 1.

The direct-current power supply 111 supplies, for example, a 380 V direct-current voltage Vin to a section between input nodes N1 and N2. The electrolytic capacitor 114 is coupled between the input nodes N1 and N2, is charged with the input voltage Vin, and outputs the accumulated voltage. The primary winding 117 of the transformer 116 is coupled between the input node N1 and a drain of the field-effect transistor 115. The field-effect transistor 115 is a switching element. A gate of the field-effect transistor 115 is coupled to a pulse width modulation (PWM) controller 144, and a source of the field-effect transistor 115 is coupled to the input node N2. The field-effect transistor 115 may be implemented by a plurality of field-effect transistors coupled in parallel with each other. The secondary winding 118 is coupled between an anode of the diode 119 and an output node N4. An anode of the diode 120 is coupled to the output node N4, and a cathode thereof is coupled to a cathode of the diode 119. The inductor 121 is coupled between the cathode of the diode 119 and the output node N3. The electrolytic capacitor 122 is coupled between the output nodes N3 and N4.

The transformer 116 transforms a voltage in the primary winding 117 and outputs the transformed voltage to the secondary winding 118. Specifically, when a voltage is applied to the primary winding 117, a voltage lower than the voltage in the primary winding 117 is generated in the secondary winding 118. The diodes 119 and 120 constitute a rectifier circuit to rectify the voltage in the secondary winding 118. The inductor 121 and the electrolytic capacitor 122 constitute a smoothing circuit to smooth a voltage in the rectifier circuit and outputs the smoothed voltage to a section between the output nodes N3 and N4. The output voltage Vout between the output nodes N3 and N4 is, for example, a 12 V direct-current voltage and is supplied to the load 103 as a power-supply voltage.

A high-frequency pulse control signal S1 is input to the gate of the field-effect transistor 115. The control signal S1 is a gate voltage of the field-effect transistor 115. The PWM controller 144 controls a pulse width of the control signal S1 for the field-effect transistor 115. The PWM controller 144 increases the pulse width of the control signal S1 for the field-effect transistor 115, when the output voltage Vout is lower than a target voltage (for example, 12 V) Vref, and reduces the pulse width of the control signal S1 for the field-effect transistor 115, when the output voltage Vout is higher than the target voltage (for example, 12 V) Vref, as described below. This allows the PWM controller 144 to perform control so that the output voltage Vout between the output nodes N3 and N4 approaches the target voltage (for example, 12 V) Vref, even when the output voltage Vout changes owing to a variation in the load 103.

The voltage detection circuit 112 detects a voltage between the input nodes N1 and N2 as the input voltage Vin of the power supply circuit 101. The current detection circuit 113 detects a current flowing through the input node N1 as an input current Iin of the power supply circuit 101. The voltage detection circuit 124 detects a voltage between the output nodes N3 and N4 as the output voltage Vout of the power supply circuit 101. The current detection circuit 123 detects a current flowing to the output node N3 as an output current Iout of the power supply circuit 101.

In order to provide electrical insulation between the voltage detection circuit 124 and an analog-to-digital (A/D) converter 133, the voltage detection circuit 124 is optically coupled to the A/D converter 133 via a photocoupler. Also, in order to provide electrical insulation between the current detection circuit 123 and an A/D converter 134, the current detection circuit 123 is optically coupled to the A/D converter 134 via a photocoupler.

In this case, when the sensitivity of the photocoupler for the voltage detection circuit 124 decreases owing to deterioration, the output voltage Vout detected by the voltage detection circuit 124 becomes lower than the voltage between the nodes N3 and N4. Also, when the sensitivity of the photocoupler for the current detection circuit 123 decreases owing to deterioration, the output current Iout detected by the current detection circuit 123 becomes smaller than the current flowing to the node N3. In this case, the control device 102 detects deterioration of the power supply circuit 101 and causes the power supply circuit 101 to stop. Details of the control device 102 will be described below.

The control device 102 includes A/D converters 131 to 134, a memory 135, a loss resistance calculator 139, a target-voltage generator 140, a subtractor 141, a compensator 142, a switching portion 143, the PWM controller 144, a duty-ratio calculator 145, and a deterioration detector 146. The loss resistance calculator 139, the target-voltage generator 140, the subtractor 141, the compensator 142, the switching portion 143, the duty-ratio calculator 145, and the deterioration detector 146 may be implemented by hardware or may be implemented by software.

The A/D converter 131 converts an analog input voltage Vin detected by the voltage detection circuit 112 into a digital input voltage Vin. The A/D converter 132 converts an analog input current Iin detected by the current detection circuit 113 into a digital input current Iin. The A/D converter 133 converts an analog output voltage Vout detected by the voltage detection circuit 124 into a digital output voltage Vout. The A/D converter 134 converts an analog output current Iout detected by the current detection circuit 123 into a digital output current Iout.

The target-voltage generator 140 stores the target voltage Vref and outputs the target voltage Vref. The target voltage Vref is, for example, 12 V. The subtractor 141 subtracts the digital output voltage Vout from the target voltage Vref and outputs the subtraction result to the compensator 142. In accordance with the subtraction result from the subtractor 141, the compensator 142 calculates a duty ratio Da. The duty ratio Da is a duty ratio of the control signal S1 and is represented by Vout/Vin. The compensator 142 calculates the duty ratio Da so that the output voltage Vout approaches the target voltage Vref. For example, when the output voltage Vout is lower than the target voltage Vref, the compensator 142 increases the duty ratio Da, and when the output voltage Vout is larger than the target voltage Vref, the compensator 142 reduces the duty ratio Da. When the duty ratio Da increases, the pulse width of the control signal S1 increases, and the output voltage Vout increases. When the duty ratio Da decreases, the pulse width of the control signal S1 decreases, and the output voltage Vout decreases. This feedback control makes it possible to maintain the output voltage Vout at a constant value of the target voltage Vref. As described above, the subtractor 141 and the compensator 142 constitute a duty-ratio calculator and calculates the duty ratio Da of the control signal S1 for the field-effect transistor 115 in the power supply circuit 101 so that the output voltage Vout approaches the target voltage Vref.

The memory 135 has a work memory 137 and stores a program 136 and a data table 138. The program 136 is a power-supply management program. When the control device 102 is a microcomputer, a central processing unit (CPU) in the microcomputer executes the program 136 to thereby realize the functions of the control device 102.

FIG. 2A illustrates an example of the data table 138. For example, an output voltage of the power supply circuit 101 is 12 V, and a rated output power thereof is 500 W. The data table 138 indicates a correspondence relationship between the output current Iout and a loss resistance Rloss. Details of the loss resistance Rloss are described later.

FIG. 2B illustrates an example of the work memory 137. For example, the input voltage Vin of the power supply circuit 101 is 380 V, the output voltage thereof is 12 V, and the rated output power thereof is 500 W. The work memory 137 stores correspondence relationships of the output current Iout, the ratio of the duty ratio Da versus the duty ratio Dt, the output voltage Vout, the input voltage Vin, and the input current Iin. Details of the duty ratio Dt are described later.

The loss resistance calculator 139 calculates the loss resistance Rloss, based on the digital input voltage Vin, the digital input current Iout, the digital output voltage Vout, and the digital the output current Iout. The loss resistance calculator 139 writes the data table 138 indicating the correspondence relationship between the output current Iout and the loss resistance Rloss to the memory 135, as illustrated in FIG. 2A. Details of the loss resistance calculator 139 are described later.

The duty-ratio calculator 145 calculates the duty ratio Dt, based on the loss resistance Rloss, the digital input voltage Vin, the digital output voltage Vout, and the digital the output current Iout in the data table 138. The duty ratio Dt is a theoretical duty ratio of the control signal S1. The duty ratio Da is an effective duty ratio of the control signal S1. The duty-ratio calculator 145 outputs the duty ratio Dt to the deterioration detector 146. Details of the duty-ratio calculator 145 are described later.

The deterioration detector 146 writes the correspondence relationships of the output current Iout, the ratio of the duty ratio Da versus the duty ratio Dt, the output voltage Vout, the input voltage Vin, and the input current Iin to the work memory 137, as illustrated in FIG. 2B. The deterioration detector 146 detects deterioration of the power supply circuit 101, based on the duty ratio Da, the duty ratio Dt, and the output current Iout. Upon detecting deterioration of the power supply circuit 101, the deterioration detector 146 outputs a warning signal S3 to the warning device 104 and outputs a stop signal S2 indicating "1" to the switching portion 143. When the deterioration detector 146 does not detect deterioration of the power supply circuit 101, the deterioration detector 146 does not output the warning signal S3 to the warning device 104 and outputs a stop signal S2 indicating "0" to the switching portion 143. Details of the deterioration detector 146 are described later. The control device 102 is coupled to the warning device 104 via a power management bus (PMBUS). The warning device 104 displays warning information indicating deterioration of the power supply circuit 101 by using a display, a light-emitting diode (LED), or the like. This allows a user to replace the power supply circuit 101 upon recognizing the warning information, before the power supply circuit 101 fails.

When the stop signal S2 indicates "0", the switching portion 143 outputs the duty ratio Da, output by the compensator 142, to the PWM controller 144. In this case, the PWM controller 144 outputs a control signal S1 having a pulse with a pulse width of the duty ratio Da to the gate of the field-effect transistor 115. The duty ratio of the control signal S1 is Da. The field-effect transistor 115 performs on/off operations in accordance with the control signal S1, so that the output voltage Vout is controlled to a voltage corresponding to the duty ratio Da.

Also, when the stop signal S2 indicates "1", the switching portion 143 is put into an off state and does not output the duty ratio Da, output by the compensator 142, to the PWM controller 144. In this case, the PWM controller 144 outputs, to the gate of the field-effect transistor 115, the control signal S1 whose duty ratio is 0 and that is fixed to a low level. In this case, the field-effect transistor 115 maintains the off state, and the output voltage Vout maintains 0 V. The power supply circuit 101 stops.

As described above, the deterioration detector 146 and the switching portion 143 constitute an output portion. The output portion outputs the duty ratio Da to the PWM controller 144 when the power supply circuit 101 has not deteriorated and causes the power supply circuit 101 to stop when the power supply circuit 101 has deteriorated.

Figure 3:
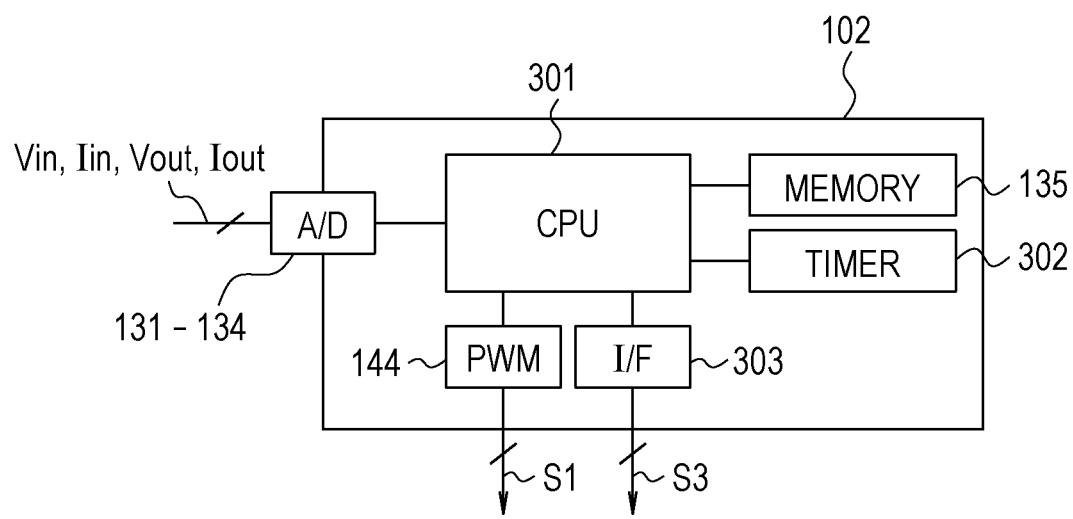
FIG. 3 is a diagram illustrating an example hardware configuration of a control device.

FIG. 3 is a diagram illustrating an example hardware configuration of the control device 102. The control device 102 is, for example, a microcomputer and includes a CPU 301, a timer 302, and a communication interface 303, in addition to the A/D converters 131 to 134, the memory 135, and the PWM controller 144 described above. The CPU 301 controls the control device 102. The timer 302 counts a timer value. The memory 135 stores the program 136 and so on therein. By executing the program 136 in the memory 135, the CPU 301 realizes the functions of the loss resistance calculator 139, the target-voltage generator 140, the subtractor 141, the compensator 142, the switching portion 143, the duty-ratio calculator 145, and the deterioration detector 146 illustrated in FIG. 1. The CPU 301 also outputs the warning signal S3 via the communication interface 303.

The present embodiment may be realized by a computer executing a program. A computer-readable recording medium in which the above-described program is recorded and a computer program product, such as the above-described program, may also be applicable as the present embodiment. Examples of the recording medium include a floppy disk, a hard disk, an optical disk, a magneto-optical disk, a compact disc read-only memory (CD-ROM), a magnetic tape, a nonvolatile memory card, and a ROM.

Figure 4A:
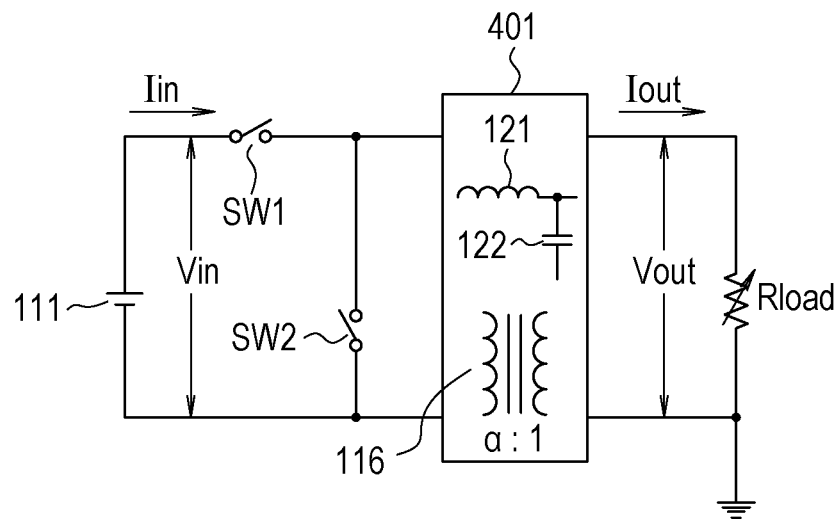
FIG. 4A is a diagram illustrating an equivalent circuit of a power supply circuit when there is no loss.

FIG. 4A is a diagram illustrating an equivalent circuit of the power supply circuit 101 when there is no loss. When the field-effect transistor 115 illustrated in FIG. 1 is in an on state, a switch SW1 is turned on, and a switch SW2 is turned off, so that the direct-current power supply 111 supplies energy to a circuit portion 401. When the field-effect transistor 115 illustrated in FIG. 1 is in the off state, the switch SW1 is turned off, and the switch SW2 is turned on, so that the circuit portion 401 releases energy. The circuit portion 401 has the transformer 116, the inductor 121, the electrolytic capacitor 122, and so on. The turns ratio of the primary winding 117 versus the secondary winding 118 in the transformer 116 is α:1. A load resistance Rload corresponds to the resistance of the load 103 illustrated in FIG. 1. The output voltage Vout is a voltage across two opposite ends of the load resistance Rload. In this case, the duty ratio Dt is represented by expression (1). When there is no loss, the duty ratio Da is equal to the duty ratio Dt.

$$Dt=\alpha \cdot Vout/Vin \quad (1)$$

Figure 4B:
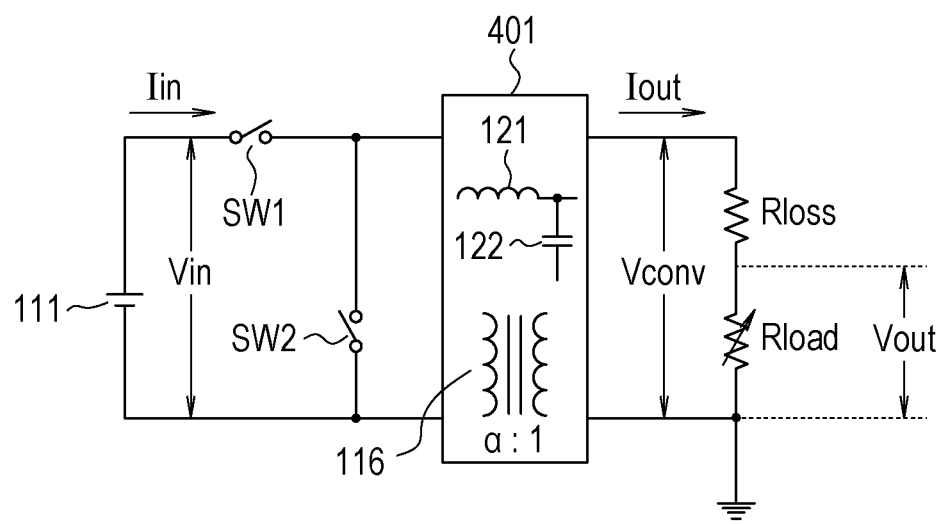
FIG. 4B is a diagram illustrating an equivalent circuit of the power supply circuit when there is loss.

FIG. 4B is a diagram illustrating an equivalent circuit of the power supply circuit 101 when there is loss. The equivalent circuit in FIG. 4B is an equivalent circuit obtained by adding the loss resistance Rloss to the equivalent circuit in FIG. 4A. The loss resistance Rloss represents an equivalent resistance corresponding to the loss power of the power supply circuit 101 and is coupled in series with the load resistance Rload. The loss resistance calculator 139 determines the loss resistance Rloss in accordance with expression (2). An input power Pin is a product of the input voltage Vin and the input current Iin. An output power Pout is a product of the output voltage Vout and the output current Iout. The loss resistance calculator 139 subtracts the output power Pout from the input power Pin to thereby determine a loss power and divides the loss power by the square of the output current Iout to thereby determine the loss resistance Rloss corresponding to the loss power.

$$R_{loss} = \frac{P_{in} - P_{out}}{I_{out}^2} = \frac{V_{in}I_{in} - V_{out}I_{out}}{I_{out}^2} \qquad (2)$$

A voltage Vconv is a voltage across two opposite ends of a serial connection of the loss resistance Rloss and the load resistance Rload. The duty-ratio calculator 145 calculates the duty ratio Dt in accordance with expression (3). Specifically, the duty-ratio calculator 145 divides the output voltage Vout by the output current Iout to thereby determine the load resistance Rload. The duty-ratio calculator 145 then determines a sum of the load resistance Rload and the loss resistance Rloss, determines a product of the sum and the output current Iout, divides the product by the input voltage Vin, and uses a product of the result of the division and the turns ratio α as the duty ratio Dt.

$$D_t = \alpha \frac{V_{conv}}{V_{in}} = \alpha \frac{1}{\varepsilon} \cdot \frac{V_{out}}{V_{in}} = \alpha \cdot \frac{(R_{load} + R_{los}) \cdot I_{out}}{V_{in}} \qquad (3)$$
$$= \alpha \cdot \frac{(V_{out}/I_{out} + R_{loss}) \cdot I_{out}}{V_{in}}$$

Figure 5:
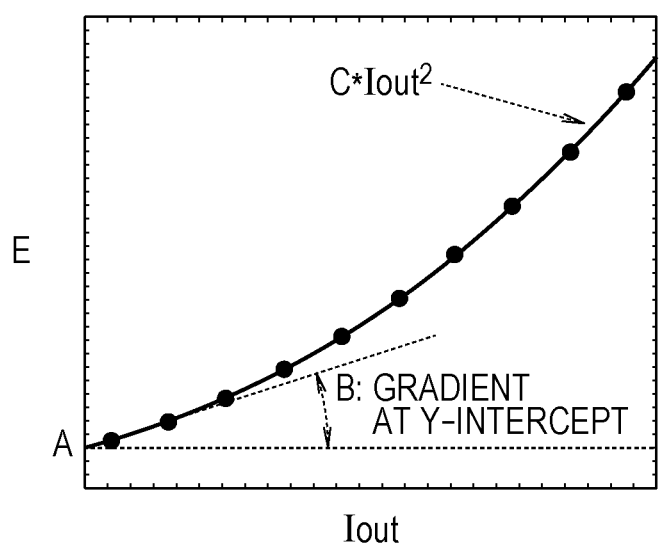
FIG. 5 is a graph illustrating a relationship between a loss power and an output current of the power supply circuit.

FIG. 5 is a graph illustrating a relationship between a loss power E and the output current Iout of the power supply circuit 101. The loss power E may be approximated using expression (4).

$$E \approx A + B \cdot Iout + C \cdot Iout^2 \qquad (4)$$

In this case, the constant term A indicates loss that is not dependent on the output current Iout. For example, the constant term A represents the power consumed by the control device 102, loss due to leakage current, iron loss of an inductor, and so on.

The proportional term B represents loss that is proportional to the output current Iout. For example, the proportional term B represents switching loss of the field-effect transistor 115 and so on.

The quadratic term C represents loss that is proportional to the square of the output current Iout. For example, the quadratic term C represents resistance loss of a substrate and so on.

Next, a description will be given of deterioration of the voltage detection circuit 124. When the sensitivity of the photocoupler for the voltage detection circuit 124 decreases owing to deterioration, and the gain of the voltage detection circuit 124 decreases to β times (0<β<1), the duty ratio Da increases as in expression (5). In response, the voltage between the output nodes N3 and N4 increases to 1/β of output voltage Vout detected by the voltage detection circuit 124. In this case, the duty ratio Da does not depend on the output current Iout and is constant.

$$Da = Dt/\beta \qquad (5)$$

Figure 6A:
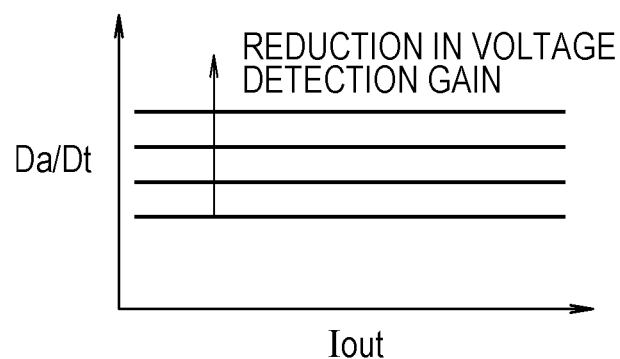
FIG. 6A is a graph illustrating a relationship between Da/Dt and Iout when a gain of a voltage detection circuit decreases.

FIG. 6A is a graph illustrating a relationship between Da/Dt and Iout when the gain β of the voltage detection circuit 124 decreases. Da/Dt is the ratio of duty ratio Da versus the duty ratio Dt. According to (5), Da/Dt is equal to 1/β, does not depend on the output current Iout, and is constant. Da/Dt increases, as the gain β decreases. When Da/Dt does not depend on the output current Iout, and Da/Dt becomes larger than a threshold, the deterioration detector 146 can detect deterioration of the voltage detection circuit 124.

Next, a description will be given of deterioration of the current detection circuit 123. When the sensitivity of the photocoupler for the current detection circuit 123 deteriorates, and the gain of the current detection circuit 123 decreases to γ times (0<γ<1), the duty ratio Da increases as in expression (6). In response, current that flows to the output node N3 increases to 1/γ of the output current Iout detected by the current detection circuit 123. In this case, R'load represents an apparent load resistance. R'loss represents an apparent loss resistance.

$$Da \approx Dt(R'loss+R'load)/R'loss \qquad (6)$$

An apparent loss power E' is approximated as in expression (7). The apparent loss resistance R'loss is approximated as in expression (8). According to expressions (6) and (8), the duty ratio Da is given by expression (9). In expression (9), when the output current Iout is sufficiently large, the term for the output current Iout becomes dominant, and the duty ratio Da is given by expression (10). In this case, the duty ratio Da is proportional to the output current Iout.

$$E' \approx A + B \cdot \frac{1}{\gamma} \cdot I_{out} + C \cdot \frac{1}{\gamma^2} \cdot I_{out}^2 \qquad (7)$$

$$R'_{loss} \approx \frac{A + B \cdot \frac{1}{\gamma} \cdot I_{out} + C \cdot \frac{1}{\gamma^2} \cdot I_{out}^2}{\frac{1}{\gamma^2} \cdot I_{out}^2} \qquad (8)$$

$$D_a \approx \left(1 + \frac{A \cdot \frac{\gamma}{I_{out}} + B + C \cdot \frac{I_{out}}{\gamma}}{V_{out}}\right) \cdot D_t \qquad (9)$$

$$D_a \approx \left(1 + C \frac{I_{ouy}}{\gamma \cdot V_{out}}\right) \cdot D_t \qquad (10)$$

Figure 6B:
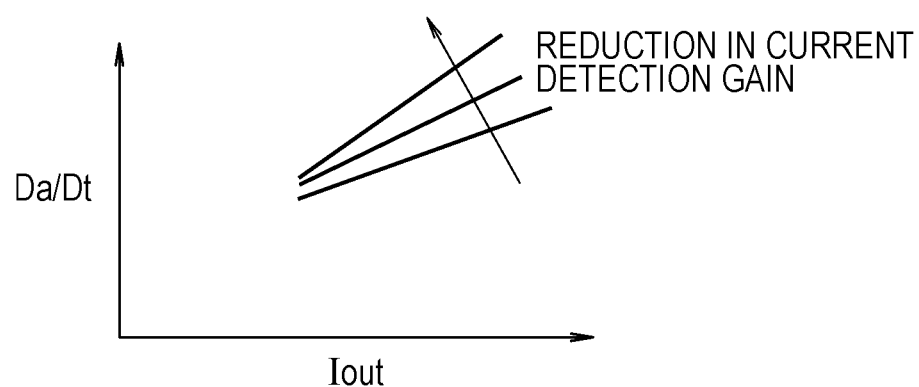
FIG. 6B is a graph illustrating a relationship between Da/Dt and Iout when a gain of a current detection circuit decreases.

FIG. 6B is a graph illustrating a relationship between Da/Dt and Iout when the gain γ of the current detection circuit 123 decreases. As in expression (10), Da/Dt is proportional to the output current Iout. Da/Dt increases, as the gain γ decreases. In a case in which Da/Dt is proportional to the output current Iout in a range in which the output current Iout is larger than a first current threshold, when Da/Dt becomes larger than a threshold, the deterioration detector 146 can detect deterioration of the current detection circuit 123.

Next, a description will be given of a case in which loss power increases in the power supply circuit 101 owing to deterioration of a portion other than the current detection circuit 123 and the voltage detection circuit 124. The loss power E in equation (4) is loss power when the power supply circuit 101 has no deterioration. When the power supply circuit 101 deteriorates, the constant term A becomes a constant term A', the proportional term B becomes a proportional term B', and the quadratic term C becomes a quadratic term C'. In this case, loss power E" is given by expression (11).

$$E''A'+B' \cdot Iout+C' \cdot Iout^2 \qquad (11)$$

The loss resistance Rloss corresponding to the loss power E in expression (4) is given by expression (12). A loss resistance Rloss" corresponding to the loss power E" in equation (11) is given by expression (13). The duty ratio Da is given by expression (14).

$$Rloss = E / Iout^2 \quad (12)$$

$$Rloss'' = E'' / Iout^2 \quad (13)$$

$$D_a \approx \left(1 + \frac{R''_{loss} - R_{loss}}{R_{load}}\right) \cdot D_t \quad (14)$$

$$\approx \left(1 + \frac{(A' - A)/I_{out} + (B' - B) + (C' - C)I_{out}}{V_{out}}\right) D_t$$

In expression (14), when the output current Iout is large, the duty ratio Da is approximated as in expression (15). In this case, the term for the output current Iout becomes dominant, and the duty ratio Da is proportional to the output current Iout. When the loss in the quadratic term C increases to the loss in the quadratic term C' owing to deterioration of the power supply circuit 101, the duty ratio Da increases. In a case in which the output current Iout is large, and the duty ratio Da is proportional to the output current Iout, when the duty ratio Da becomes larger than the threshold, the deterioration detector 146 can detect deterioration of the power supply circuit 101 which is caused by an increase in the loss in the quadratic term C'. Since the duty ratio Da in each of expressions (10) and (15) is proportional to the output current Iout, it is difficult to distinguish a cause of the deterioration.

$$D_a \approx (1 + (C' - C)^{Iout}/_{vOut}) D_t \quad (15)$$

When the output current Iout is small in expression (14), the duty ratio Da is approximated as in expression (16). In this case, the second and third terms in the parenthesis become dominant, and the duty ratio Da is inversely proportional to the output current Iout. When the loss in the constant term A increases to the loss in the constant term A', or the loss in the proportional term B increases to the loss in the proportional term B' owing to deterioration of the power supply circuit 101, the duty ratio Da increases. In a case in which the output current Iout is small, and the duty ratio Da is inversely proportional to the output current Iout, when the duty ratio Da becomes larger than the threshold, the deterioration detector 146 can detect deterioration of the power supply circuit 101 owing to an increase in the loss in the constant term A' or the proportional term B'.

$$D_a \approx \left(1 + \frac{A' - A}{I_{out} V_{out}} + \frac{B' - B}{V_{out}}\right) D_t \quad (16)$$

Figure 7:
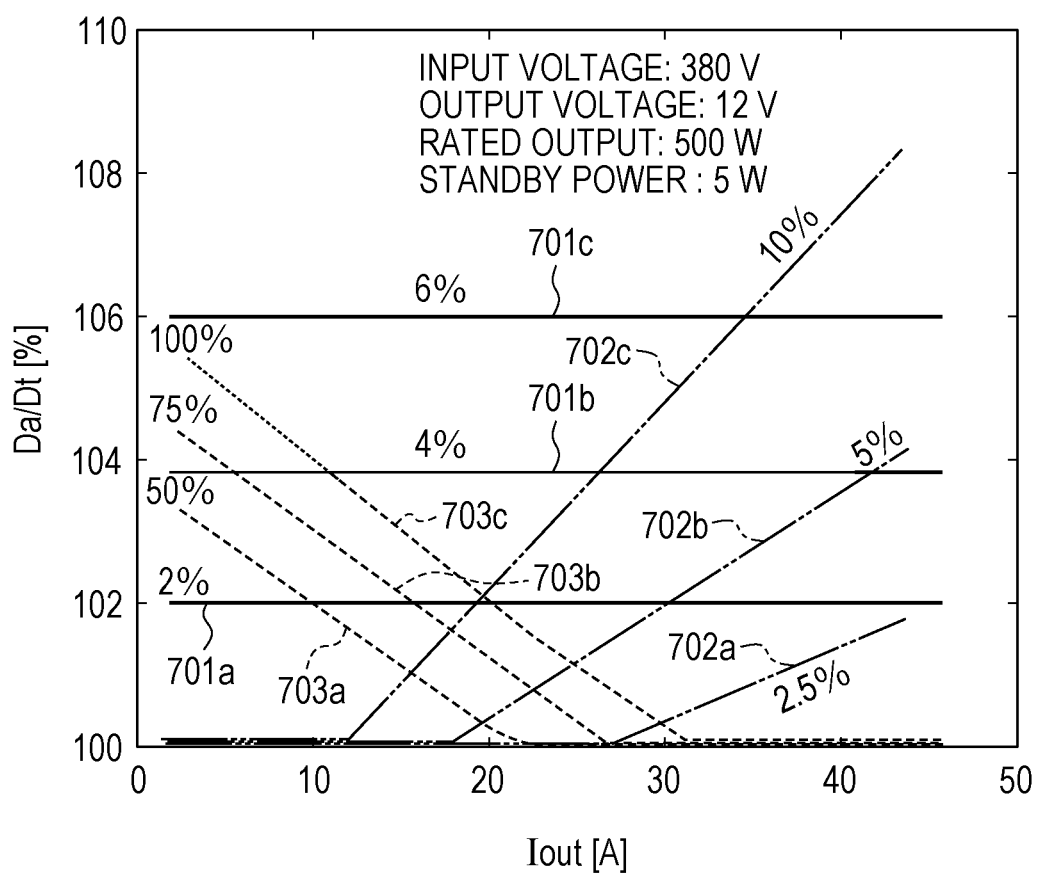
FIG. 7 is a graph illustrating relationships between Da/Dt and Iout.

FIG. 7 is a graph illustrating relationships between Da/Dt and Iout. When the loss power is 0, Da/Dt is 100%. For example, the input voltage Vin is 380 V, the output voltage Vout is 12 V, the rated output power is 500 W, and the standby power is 5 W.

Characteristic lines 701a to 701c indicate deterioration due to a decrease in the sensitivity (gain) of the voltage detection circuit 124 in expression (5). The characteristic line 701a is a characteristic line when the sensitivity of the output voltage Vout detected by the voltage detection circuit 124 decreases by 2%. The characteristic line 701b is a characteristic line when the sensitivity of the output voltage Vout detected by the voltage detection circuit 124 decreases by 4%. The characteristic line 701c is a characteristic line when the sensitivity of the output voltage Vout detected by the voltage detection circuit 124 decreases by 6%. As indicated by the characteristic lines 701a to 701c, Da/Dt increases as the sensitivity of the output voltage Vout detected by the voltage detection circuit 124 decreases.

Characteristic lines 702a to 702c indicate deterioration of the power supply circuit 101 in expression (15). The characteristic lines 702a to 702c are in a large current area, and Da/Dt is proportional to the output current Iout and depends on an increase in the loss power in the quadratic term C. The characteristic line 702a is a characteristic line when the resistance loss power in the quadratic term C increases by 2.5%. The characteristic line 702b is a characteristic line when the resistance loss power in the quadratic term C increases by 5%. The characteristic line 702c is a characteristic line when the resistance loss power in the quadratic term C increases by 10%. As indicated by the characteristic lines 702a to 702c, Da/Dt increases as the loss power in the quadratic term C increases.

Characteristic lines 703a to 703c indicate deterioration of the power supply circuit 101 in expression (16). The characteristic lines 703a to 703c are in a small current area, and Da/Dt is inversely proportional to the output current Iout and depends on an increase in the loss power in the constant term A or the proportional term B. The characteristic line 703a is a characteristic line when the fixed loss power (standby power) in the constant term A increases by 50% (2.5 W). The characteristic line 703b is a characteristic line when the fixed loss power in the constant term A increases by 75% (3.8 W). The characteristic line 703c is a characteristic line when the fixed loss power in the constant term A increases by 100% (5 W). As indicated by the characteristic lines 703a to 703c, Da/Dt increases as the loss power in the constant term A or the proportional term B increases.

FIG. 8 is a table illustrating major deterioration factors of the power supply circuit 101. A deterioration factor 801 corresponds to expression (10) and is deterioration due to a decrease in the sensitivity of the photocoupler for the current detection circuit 123. In the deterioration factor 801, Da/Dt is proportional to the output current Iout at the large output current Iout side.

A deterioration factor 802 corresponds to expression (5) and is deterioration due to a decrease in the sensitivity of the photocoupler for the voltage detection circuit 124. In the deterioration factor 802, Da/Dt does not depend on the output current Iout.

A deterioration factor 803 corresponds to the loss in the quadratic term C in expression (15) and is deterioration due to an increase in an on-resistance of the field-effect transistor 115 or the diodes 119 and 120. In the deterioration factor 803, Da/Dt is proportional to the output current Iout at the large output current Iout side.

A deterioration factor 804 corresponds to the loss in the proportional term B in expression (16) and is deterioration due to a decrease in the switching speed of the field-effect transistor 115. In the deterioration factor 804, Da/Dt is inversely proportional to the output current Iout at the small output current Iout side.

A deterioration factor 805 corresponds to the loss in the constant term A in expression (16) and is insulation deterioration of a semiconductor element, such as the field-effect transistor 115 or the diode 119 or 120. In the deterioration factor 805, Da/Dt is inversely proportional to the output current Iout at the small output current Iout side.

A deterioration factor 806 corresponds to the loss in the quadratic term C in expression (15) and is deterioration of an increase in the loss resistance Rloss of the electrolytic capacitor 114 or 122. In the deterioration factor 806, Da/Dt is proportional to the output current Iout at the large output current Iout side.

A deterioration factor 807 corresponds to the loss in the quadratic term C in expression (15) and is deterioration due to a decrease in the capacitance of the electrolytic capacitor 114 or 122. In the deterioration factor 807, Da/Dt is proportional to the output current Iout at the large output current Iout side.

A deterioration factor 808 corresponds to the loss in the constant term A in expression (16) and is deterioration due to a decrease in the insulation of the electrolytic capacitor 114 or 122. In the deterioration factor 808, Da/Dt is inversely proportional to the output current Iout at the small output current Iout side.

A deterioration factor 809 corresponds to the loss in the quadratic term C in expression (15) and is deterioration due to an increase in the resistance of a substrate in the power supply circuit 101. In the deterioration factor 809, Da/Dt is proportional to the output current Iout at the large output current Iout.

A deterioration factor 810 corresponds to the loss in the constant term A in expression (16) and is insulation deterioration of the substrate in the power supply circuit 101. In the deterioration factor 810, Da/Dt is inversely proportional to the output current Iout at the small output current Iout side.

FIG. 9 is a table illustrating examples of a warning threshold and a stop threshold for each deterioration factor. A deterioration factor 901 corresponds to the characteristic lines 701a to 701c in FIG. 7 and is deterioration due to a decrease in the sensitivity of the voltage detection circuit 124. The deterioration detector 146 uses the warning device 104 to issue a warning when a largest amount of decrease in the gain of the output voltage Vout becomes larger than 3% (a warning threshold) and causes the power supply circuit 101 to stop when the largest amount of decrease in the gain of the output voltage Vout becomes larger than 5% (a stop threshold). These warning threshold and stop threshold are determined based on the specifications of the output voltage Vout. For example, when a reference value of the output voltage Vout is within ±5%, the warning threshold is 3%, and the stop threshold is 5%. Also, the deterioration detector 146 uses the warning device 104 to issue a warning when the largest value of Da/Dt becomes larger than 103% (a warning threshold) and causes the power supply circuit 101 to stop when the largest value of Da/Dt becomes larger than 105% (a stop threshold).

A deterioration factor 902 corresponds to the characteristic lines 703a to 703c in FIG. 7 and is deterioration due to an increase in the fixed loss power (standby power). The deterioration detector 146 uses the warning device 104 to issue a warning when a largest amount of increase in the fixed loss power becomes larger than 25% (a warning threshold) and causes the power supply circuit 101 to stop when the largest amount of increase in the fixed loss power becomes larger than 50% (a stop threshold). Also, the deterioration detector 146 uses the warning device 104 to issue a warning when the largest value of Da/Dt becomes larger than 103% (the warning threshold) and causes the power supply circuit 101 to stop when the largest value of Da/Dt becomes larger than 105% (the stop threshold). The deterioration factor 902 is a failure in the control device 102 or a reduction in the insulation of the substrate and the semiconductor elements in the power supply circuit 101, and it is important that the warning threshold be reduced in order to inhibit a failure due to firing or smoking.

A deterioration factor 903 corresponds to the characteristic lines 702a to 702c in FIG. 7 and is deterioration due to an increase in the resistance loss power. The deterioration detector 146 uses the warning device 104 to issue a warning when the largest amount of increase in the resistance loss power becomes larger than 10% (a warning threshold) and causes the power supply circuit 101 to stop when the largest amount of increase in the resistance loss power becomes larger than 20% (a stop threshold). The deterioration detector 146 uses the warning device 104 to issue a warning when the largest value of Da/Dt becomes larger than 108% (a warning threshold) and causes the power supply circuit 101 to stop when the largest value of Da/Dt becomes larger than 115% (a stop threshold). In the deterioration factor 903, the warning threshold and the stop threshold are determined by a cooling margin of the power supply circuit 101. For example, when a margin of 10 to 20% is taken during design for possible heat generation, the deterioration detector 146 performs the warning or stopping, before the margin is exceeded.

A deterioration factor 904 corresponds to expression (10) and is deterioration due to a decrease in the sensitivity of the current detection circuit 123. The deterioration detector 146 uses the warning device 104 to issue a warning when the largest amount of decrease in the gain of the output current Iout becomes larger than 20% (a warning threshold) and causes the power supply circuit 101 to stop when the largest amount of decrease in the gain of the output current Iout becomes larger than 40% (a stop threshold). Each of the deterioration factors 901 and 904 is deterioration due to a decrease in the sensitivity of the photocouplers. The photocoupler for the current detection circuit 123 and the photocoupler for the voltage detection circuit 124 are provided on the same substrate. Thus, when the deterioration factor 904 occurs, the deterioration factor 901 is also thought to occur concurrently. The warning threshold and the stop threshold for the deterioration factor 904 are one order of magnitude larger than the warning threshold and the stop threshold for the deterioration factor 901. Thus, when the warning and stopping according to the deterioration factor 901 are performed, this means that issuing warning and stopping according to the deterioration factor 904 are also performed. Accordingly, the warning and stopping due to the deterioration factor 904 may be omitted.

Figure 10:
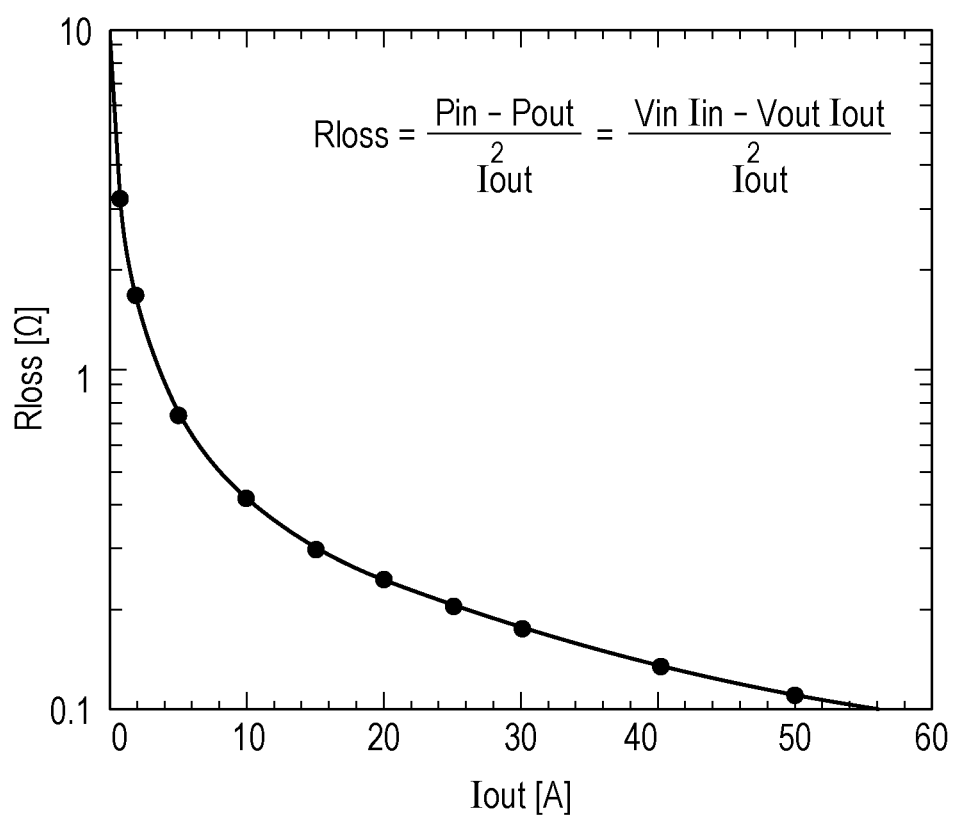
FIG. 10 is a graph illustrating a relationship between an output current and a loss resistance.

FIG. 10 is a graph illustrating a relationship between the output current Iout and the loss resistance Rloss. The loss resistance calculator 139 subtracts the product of the output voltage Vout and the output current Iout from the product of the input voltage Vin and the input current Iin to thereby determine a loss power and divides the loss power by the square of the output current Iout to determine the loss resistance Rloss corresponding to the loss power, as in expression (2). The loss resistance calculator 139 then writes the data table 138 indicating the relationship between the output current Iout and the loss resistance Rloss to the memory 135, as in FIG. 2A. The loss resistance calculator 139 may calculate loss resistances Rloss corresponding to all output currents Iout in accordance with expression (2). Also, in accordance with expression (2), the loss resistance calculator 139 may calculate loss resistances Rloss corresponding to some output currents Iout and calculate loss resistances Rloss corresponding to the remaining output currents Iout by using linear function interpolation.

Figure 11A:
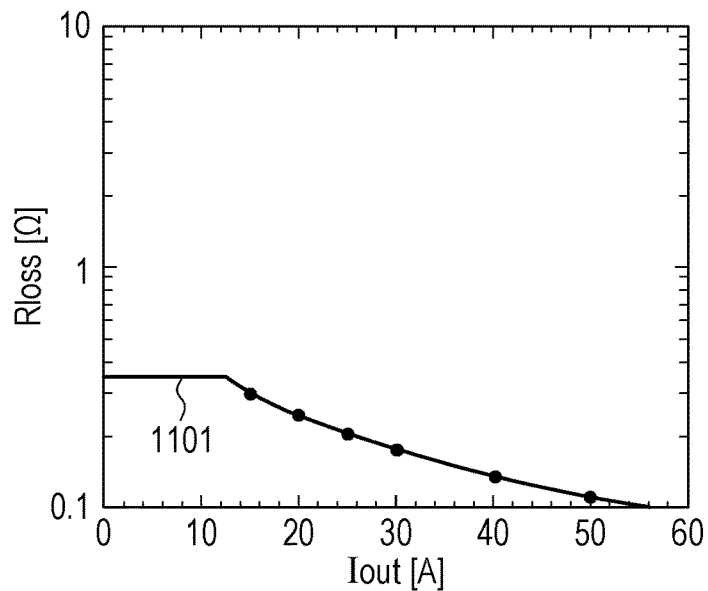
FIG. 11A is a graph illustrating another relationship between an output current and a loss resistance.

FIG. 11A is a graph illustrating another relationship between the output current Iout and the loss resistance Rloss. In an area 1101 where the output current Iout is smaller than a current threshold, the loss resistance calculator 139 sets the loss resistance Rloss to a constant value. In an area where the output current Iout is larger than or equal to the current threshold, the loss resistance Rloss is the same as the loss resistance Rloss in FIG. 10. The following description will be given of a reason why the loss resistance Rloss in FIG. 11A is set.

Figure 11B:
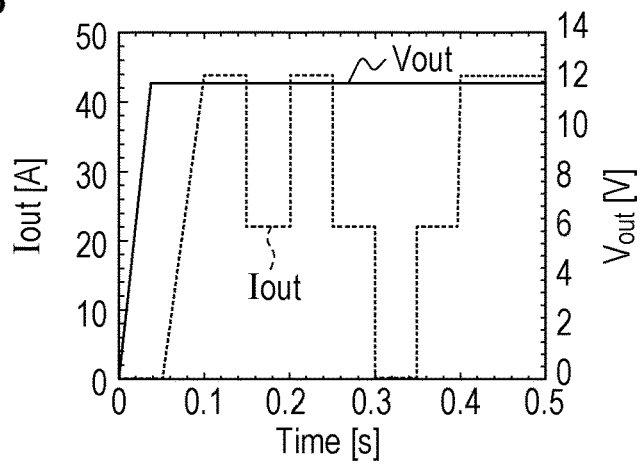
FIG. 11B is a time chart illustrating an example of changes in an output voltage and an output current with time.

FIG. 11B is a time chart illustrating an example of changes in the output voltage Vout and the output current Iout with time. After the power-supply apparatus 100 is started up, the output voltage Vout is constant at about 12 V. The output current Iout changes rapidly in response to a rapid change in the load 103.

Figure 11C:
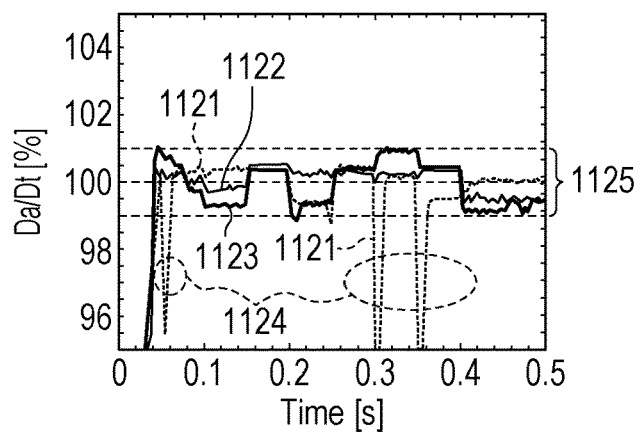
FIG. 11C is a time chart illustrating changes in Da/Dt with time.

FIG. 11C corresponds to FIG. 11B and is a time chart illustrating changes in Da/Dt with time. A characteristic line 1121 is a characteristic line of Da/Dt when the loss resistance Rloss in FIG. 10 is used. A characteristic line 1122 is a characteristic line of Da/Dt when the loss resistance Rloss in FIG. 11A is used. A characteristic line 1123 is a characteristic line of Da/Dt when the loss resistance Rloss that is constant irrespective of the output current Iout.

For the characteristic line 1121, when the load 103 changes rapidly even when the power supply circuit 101 does not deteriorate, Da/Dt gets out of a threshold range 1125, and deterioration of the power supply circuit 101 is falsely detected in an area 1124. In contrast, for the characteristic line 1122, even when the load 103 changes rapidly, Da/Dt is within the threshold range 1125, thus making it possible to inhibit false detection of deterioration of the power supply circuit 101 and making it possible to suppress the deterioration detection accuracy of the power supply circuit 101 to within ±0.5%.

Figure 12:
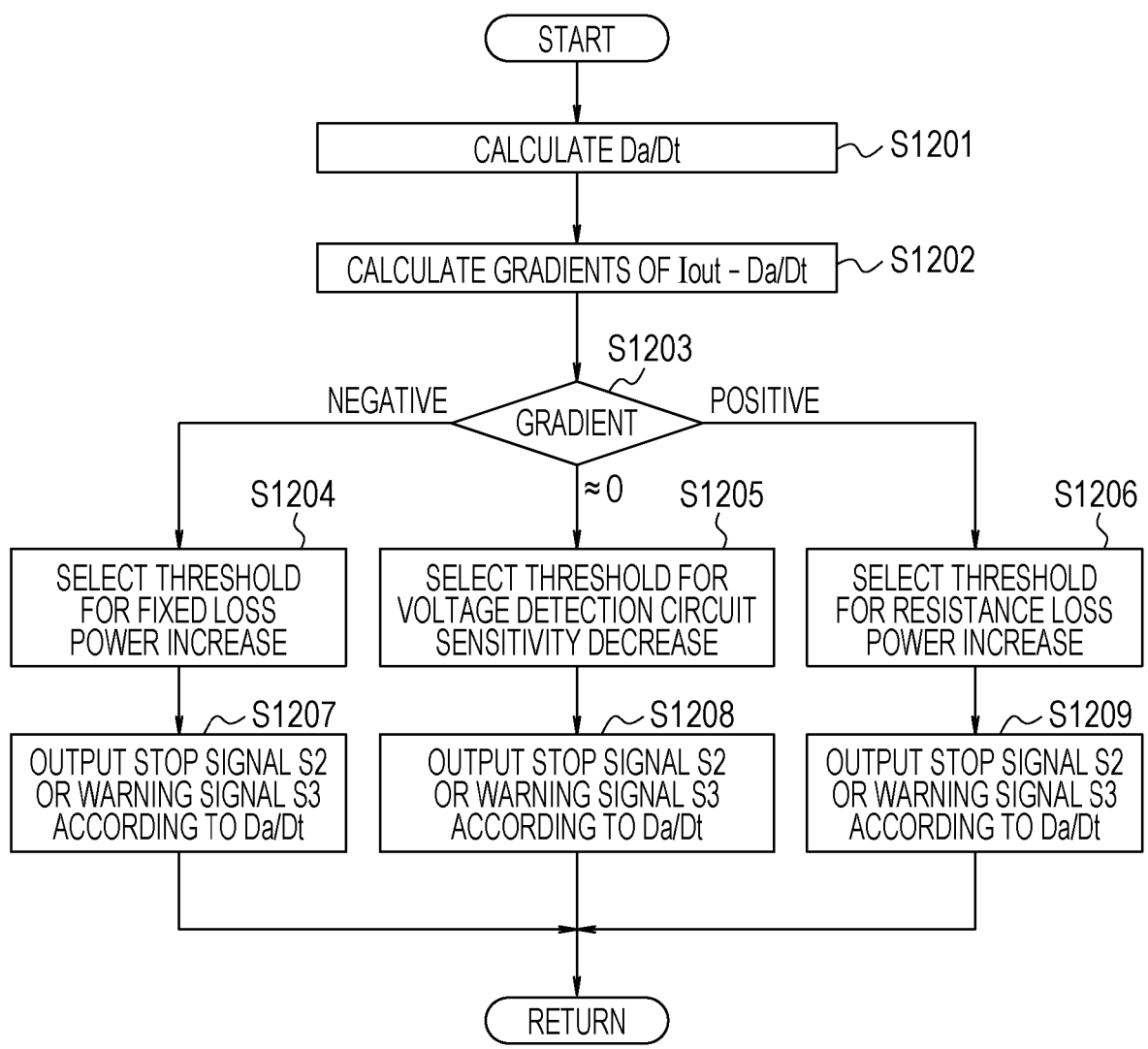
FIG. 12 is a flowchart illustrating a control method for the power-supply apparatus.

FIG. 12 is a flowchart illustrating a control method for the power-supply apparatus 100. In operation S1201, the loss resistance calculator 139 calculates the loss resistance Rloss in accordance with expression (2). The compensator 142 calculates the duty ratio Da. The duty-ratio calculator 145 calculates the duty ratio Dt in accordance with expression (3). The deterioration detector 146 calculates Da/Dt and writes Da/Dt with respect to all the output currents Iout to the work memory 137.

Next, in operation S1202, the deterioration detector 146 calculates the gradients of Da/Dt with respect to the output currents Iout, as illustrated in FIG. 7. For example, the deterioration detector 146 calculates the gradients of the characteristic lines 701a to 701c, the gradients of the characteristic lines 702a to 702c in the large current area, and the gradients of the characteristic lines 703a to 703c in the small current area. The deterioration detector 146 determines the gradients of Da/Dt with respect to three or more output currents Iout.

Next, if the gradient of interest in operation S1202 is smaller than a first negative value in operation S1203, the gradient corresponds to the characteristic lines 703a to 703c, and thus the deterioration detector 146 advances to operation S1204. If the gradient of interest in operation S1202 is smaller than or equal to a first positive value and is larger than or equal to the first negative value, the gradient corresponds to the characteristic lines 701a to 701c, and thus the deterioration detector 146 advances to operation S1205. Also, if the gradient of interest in operation S1202 is larger than the first positive value, the gradient corresponds to the characteristic lines 702a to 702c, and thus the deterioration detector 146 advances to operation S1206.

In operation S1206, the deterioration detector 146 selects the warning threshold (108%) and the stop threshold (115%) for the deterioration factor 903 in FIG. 9. Next, in operation S1209, when the largest value of Da/Dt is larger than the warning threshold (108%), the deterioration detector 146 outputs the warning signal S3 corresponding to the characteristic lines 702a to 702c to the warning device 104. When the largest value of Da/Dt is larger than the stop threshold (115%), the deterioration detector 146 outputs the stop signal S2 indicating "1" to cause the power supply circuit 101 to stop, and when the largest value of Da/Dt is not larger than the stop threshold (115%), the deterioration detector 146 outputs the stop signal S2 indicating "0". When the stop signal S2 indicating "0" is input to the switching portion 143, the switching portion 143 outputs the duty ratio Da to the PWM controller 144.

That is, in a case in which Da/Dt is proportional to the output current Iout in a range in which the output current Iout is larger than the first current threshold, when the largest value of Da/Dt is larger than the warning threshold (108%), the deterioration detector 146 outputs the warning signal S3 corresponding to the characteristic lines 702a to 702c to the warning device 104. Also, in a case in which Da/Dt is proportional to the output current Iout in a range in which the output current Iout is larger than the first current threshold, the deterioration detector 146 outputs the stop signal S2 indicating "1" to cause the power supply circuit 101 to stop when the largest value of Da/Dt is larger than the stop threshold (115%) and outputs the stop signal S2 indicating "0" when the largest value of Da/Dt is not larger than the stop threshold (115%). When the stop signal S2 indicating "0" is input to the switching portion 143, the switching portion 143 outputs the duty ratio Da to the PWM controller 144.

In operation S1204, the deterioration detector 146 selects the warning threshold (103%) and the stop threshold (105%) for the deterioration factor 902 illustrated in FIG. 9. Next, in operation S1207, when the largest value of Da/Dt is larger than the warning threshold (103%), the deterioration detector 146 outputs the warning signal S3 corresponding to the characteristic lines 703a to 703c to the warning device 104. Also, when the largest value of Da/Dt is larger than the stop threshold (105%), the deterioration detector 146 outputs the stop signal S2 indicating "1" to cause the power supply circuit 101 to stop, and when the largest value of Da/Dt is not larger than the stop threshold (105%), the deterioration detector 146 outputs the stop signal S2 indicating "0". When the stop signal S2 indicating "0" is input to the switching portion 143, the switching portion 143 outputs the duty ratio Da to the PWM controller 144.

That is, in a case in which Da/Dt is inversely proportional to the output current Iout in a range in which the output current Iout is smaller than a second current threshold, when the largest value of Da/Dt is larger than the warning threshold (103%), the deterioration detector 146 outputs the warning signal S3 corresponding to the characteristic lines 703a to 703c to the warning device 104. Also, in a case in which Da/Dt is inversely proportional to the output current Iout in a range in which the output current Iout is smaller than the second current threshold, the deterioration detector 146 outputs the output signal S2 indicating "1" to cause the power supply circuit 101 to stop when the largest value of Da/Dt is larger than the stop threshold (105%) and outputs the stop signal S2 indicating "0" when the largest value of Da/Dt is not larger than the stop threshold (105%). When the stop signal S2 indicating "0" is input to the switching portion 143, the switching portion outputs the duty ratio Da to the PWM controller 144.

In operation S1205, the deterioration detector 146 selects the warning threshold (103%) and the stop threshold (105%) for the deterioration factor 901 in FIG. 9. Next, in operation S1208, when the largest value of Da/Dt is larger than the warning threshold (103%), the deterioration detector 146 outputs the warning signal S3 corresponding to the characteristic lines 701a to 701c to the warning device 104. Also, when the largest value of Da/Dt is larger than the stop threshold (105%), the deterioration detector 146 outputs the stop signal S2 indicating "1" to cause the power supply circuit 101 to stop, and when the largest value of Da/Dt is not larger than the stop threshold (105%), the deterioration detector 146 outputs the stop signal S2 indicating "0". When the stop signal S2 indicating "0" is input to the switching portion 143, the switching portion 143 outputs the duty ratio Da to the PWM controller 144.

That is, in a case in which a variation in Da/Dt with respect to the output current Iout is within a threshold range, when the largest value of Da/Dt is larger than the warning threshold (103%), the deterioration detector 146 outputs the warning signal S3 corresponding to the characteristic lines 701a to 701c to the warning device 104. Also, in a case in which a variation in Da/Dt with respect to the output current Iout is within the threshold range, the deterioration detector 146 outputs the stop signal S2 indicating "1" to cause the power supply circuit 101 to stop when the largest value of Da/Dt is larger than the stop threshold (105%) and outputs the stop signal S2 indicating "0" when the largest value of Da/Dt is not larger than the stop threshold (105%). When the stop signal S2 indicating "0" is input to the switching portion 143, the switching portion 143 outputs the duty ratio Da to the PWM controller 144.

The warning device 104 may display a warning and the deterioration factor of the warning in accordance with the warning signal S3 corresponding to the characteristic lines 701a to 701c, the warning signal S3 corresponding to the characteristic lines 702a to 702c, or the warning signal S3 corresponding to the characteristic lines 703a to 703c.

It is preferable that the load 103 in the power-supply apparatus 100 have three or more operation modes, and the three or more operation modes be switched in a sufficiently short period of time with respect to the lifetime of the power supply circuit 101. For example, the load 103 may repeat a standby-state mode, a low-load operation mode, and a high-load operation mode during a day. The deterioration detector 146 records the relationships between the output currents Iout and Da/Dt in the three operation modes to the work memory 137 and determines a deterioration factor, based on the relationships. Also, when the load 103 operates with a certain output power at all times, for example, a power-supply cooling fan is provided as the load 103. The control device 102 can cause variations in the load 103 by changing the rotational speed of the power-supply cooling fan. This allows the deterioration detector 146 to obtain Da/Dt with respect to the output currents Iout in a wide range.

FIG. 13 is a table illustrating a processing method for the deterioration detector 146 according to another embodiment. For a deterioration factor 901, the deterioration detector 146 uses the warning device 104 to issue a warning when the largest value of Da/Dt becomes larger than 103% (a warning threshold) and causes the power supply circuit 101 to stop when the largest value of Da/Dt becomes larger than 105% (a stop threshold). In this case, the deterioration detector 146 performs processes that are analogous to the above-described processes in operation S1201 to S1203, S1205, and S1208 in FIG. 12.

For a deterioration factor 902, the deterioration detector 146 uses the warning device 104 to issue a warning when the gradient of Da/Dt with respect to the output current Iout becomes smaller than −0.1% (a warning threshold) and causes the power supply circuit 101 to stop when the gradient of Da/Dt with respect to the output current Iout becomes smaller than −0.2% (a stop threshold). The following description will be given of an example process in operation S1207 in FIG. 12.

In operation S1207, in a case in which the gradient of Da/Dt with respect to the output current Iout is smaller than the first negative value, when the gradient of Da/Dt with respect to the output current Iout is smaller than the warning threshold (−0.1%), the deterioration detector 146 outputs the warning signal S3 corresponding to the characteristic lines 703a to 703c to the warning device 104. Also, in a case in which the gradient of Da/Dt with respect to the output current Iout is smaller than the first negative value, the deterioration detector 146 outputs the stop signal S2 indicating "1" to cause the power supply circuit 101 to stop when the gradient of Da/Dt with respect to the output current Iout is smaller than the stop threshold (−0.2%) and outputs the stop signal S2 indicating "0" to output the duty ratio Da when the gradient of Da/Dt with respect to the output current Iout is not smaller than the stop threshold (−0.2%).

That is, in a case in which Da/Dt is inversely proportional to the output current Iout in a range in which the output current Iout is smaller than the second current threshold, when the gradient of Da/Dt with respect to the output current Iout is smaller than the warning threshold (−0.1%), the deterioration detector 146 outputs the warning signal S3 corresponding to the characteristic lines 703a to 703c to the warning device 104. Also, in a case in which Da/Dt is inversely proportional to the output current Iout in a range in which the output current Iout is smaller than the second current threshold, the deterioration detector 146 outputs the stop signal S2 indicating "1" to cause the power supply circuit 101 to stop when the gradient of Da/Dt with respect to the output current Iout is smaller than the stop threshold (−0.2%) and outputs the stop signal S2 indicating "0" to output the duty ratio Da when the gradient of Da/Dt with respect to the output current Iout is not smaller than the stop threshold (−0.2%).

For a deterioration factor 903, when the gradient of Da/Dt with respect to the output current Iout becomes larger than 0.2% (a warning threshold), the deterioration detector 146 uses the warning device 104 to issue a warning, and when the gradient of Da/Dt with respect to the output current Iout becomes larger than 0.4% (a stop threshold), the deterioration detector 146 causes the power supply circuit 101 to stop. The following description will be given of an example process in operation S1209 in FIG. 12.

In operation S1209, in a case in which the gradient of Da/Dt with respect to the output current Iout is larger than the first positive value, when the gradient of Da/Dt with respect to the output current Iout is larger than the warning threshold (0.2%), the deterioration detector 146 outputs the warning signal S3 corresponding to the characteristic lines 702a to 702c to the warning device 104. Also, in a case in which the gradient of Da/Dt with respect to the output current Iout is larger than the first positive value, the deterioration detector 146 outputs the stop signal S2 indicating "1" to cause the power supply circuit 101 to stop when the gradient of Da/Dt with respect to the output current Iout is larger than the stop threshold (0.4%) and outputs the stop signal S2 indicating "0" to output the duty ratio Da when the gradient of Da/Dt with respect to the output current Iout is not larger than the stop threshold (0.4%).

That is, in a case in which Da/Dt is proportional to the output current Iout in a range in which the output current Iout is larger than the first current threshold, when the gradient of Da/Dt with respect to the output current Iout is larger than the warning threshold (0.2%), the deterioration detector 146 outputs the warning signal S3 corresponding to the characteristic lines 702a to 702c to the warning device 104. Also, in a case in which Da/Dt is proportional to the output current Iout in a range in which the output current Iout is larger than the first current threshold, the deterioration detector 146 outputs the stop signal S2 indicating "1" to cause the power supply circuit 101 to stop when the gradient of Da/Dt with respect to the output current Iout is larger than the stop threshold (0.4%) and outputs the stop signal S2 indicating "0" to output the duty ratio Da when the gradient of Da/Dt with respect to the output current Iout is not larger than the stop threshold (0.4%).

A deterioration factor 904 in FIG. 13 may be omitted, as in FIG. 9.

Next, a description will be given of a processing method for the deterioration detector 146 according to yet another embodiment. For the deterioration factor 901, the deterioration detector 146 uses the warning device 104 to issue a warning when the largest value of the difference between the duty ratio Da and the duty ratio Dt becomes larger than the warning threshold and causes the power supply circuit 101 to stop when the largest value of the difference between the duty ratio Da and the duty ratio Dt becomes larger than the stop threshold. The following description will be given of an example process in operation S1208 in FIG. 12.

In operation S1208, in a case in which the gradient of Da/Dt with respect to the output current Iout is smaller than or equal to the first positive value and is larger than or equal to the first negative value, when the largest value of the difference between the duty ratio Da and the duty ratio Dt is larger than the warning threshold, the deterioration detector 146 outputs the warning signal S3 corresponding to the characteristic lines 701a to 701c to the warning device 104. Also, in a case in which the gradient of Da/Dt with respect to the output current Iout is smaller than or equal to the first positive value and is larger than or equal to the first negative value, the deterioration detector 146 outputs the stop signal S2 indicating "1" to cause the power supply circuit 101 to stop when the largest value of the difference between the duty ratio Da and the duty ratio Dt is larger than the stop threshold and outputs the stop signal S2 indicating "0" to output the duty ratio Da when the largest value of the difference between the duty ratio Da and the duty ratio Dt is not larger than the stop threshold.

That is, in a case in which a variation in Da/Dt with respect to the output current Iout is within the threshold range, when the largest value of the difference between the duty ratio Da and the duty ratio Dt is larger than the warning threshold, the deterioration detector 146 outputs the warning signal S3 corresponding to the characteristic lines 701a to 701c to the warning device 104. Also, in a case in which a variation in Da/Dt with respect to the output current Iout is within the threshold range, the deterioration detector 146 outputs the stop signal S2 indicating "1" to cause the power supply circuit 101 to stop when the largest value of the difference between the duty ratio Da and the duty ratio Dt is larger than the stop threshold and outputs the stop signal S2 indicating "0" to output the duty ratio Da when the largest value of the difference between the duty ratio Da and the duty ratio Dt is not larger than the stop threshold.

For the deterioration factor 902, the deterioration detector 146 uses the warning device 104 to issue a warning when the largest value of the difference between the duty ratio Da and the duty ratio Dt becomes larger than the warning threshold and causes the power supply circuit 101 to stop when the largest value of the difference between the duty ratio Da and the duty ratio Dt becomes larger than the stop threshold. The following description will be given of an example process in operation S1207 in FIG. 12.

In operation S1207, in a case in which the gradient of Da/Dt with respect to the output current Iout is smaller than the first negative value, when the largest value of the difference between the duty ratio Da and the duty ratio Dt is larger than the warning threshold, the deterioration detector 146 outputs the warning signal S3 corresponding to the characteristic lines 703a to 703c to the warning device 104. Also, in a case in which the gradient of Da/Dt with respect to the output current Iout is smaller than the first negative value, the deterioration detector 146 outputs the stop signal S2 indicating "1" to cause the power supply circuit 101 to stop when the largest value of the difference between the duty ratio Da and the duty ratio Dt is larger than the stop threshold and outputs the stop signal S2 indicating "0" to output the duty ratio Da when the largest value of the difference between the duty ratio Da and the duty ratio Dt is not larger than the stop threshold.

That is, in a case in which Da/Dt is inversely proportional to the output current Iout in a range in which the output current Iout is smaller than the second current threshold, when the largest value of the difference between the duty ratio Da and the duty ratio Dt is larger than the warning threshold, the deterioration detector 146 outputs the warning signal S3 corresponding to the characteristic lines 703a to 703c to the warning device 104. Also, in a case in which Da/Dt is inversely proportional to the output current Iout in a range in which the output current Iout is smaller than the second current threshold, the deterioration detector 146 outputs the stop signal S2 indicating "1" to cause the power supply circuit 101 to stop when the largest value of the difference between the duty ratio Da and the duty ratio Dt is larger than the stop threshold and outputs the stop signal S2 indicating "0" to output the duty ratio Da when the largest value of the difference between the duty ratio Da and the duty ratio Dt is not larger than the stop threshold.

In the deterioration factor 903, the deterioration detector 146 uses the warning device 104 to issue a warning when the largest value of the difference between the duty ratio Da and the duty ratio Dt becomes larger than the warning threshold and causes the power supply circuit 101 to stop when the largest value of the difference between the duty ratio Da and the duty ratio Dt becomes larger than the stop threshold. The following description will be given of an example process in operation S1209 in FIG. 12.

In operation S1209, in a case in which the gradient of Da/Dt with respect to the output current Iout is larger than the first positive value, when the largest value of the difference between the duty ratio Da and the duty ratio Dt is larger than the warning threshold, the deterioration detector 146 outputs the warning signal S3 corresponding to the characteristic lines 702a to 702c to the warning device 104. Also, in a case in which the gradient of Da/Dt with respect to the output current Iout is larger the first positive value, the deterioration detector 146 outputs the stop signal S2 indicating "1" to cause the power supply circuit 101 to stop when the largest value of the difference between the duty ratio Da and the duty ratio Dt is larger than the stop threshold and outputs the stop signal S2 indicating "0" to output the duty ratio Da when the largest value of the difference between the duty ratio Da and the duty ratio Dt is not larger than the stop threshold.

That is, in a case in which Da/Dt is proportional to the output current Iout in a range in which the output current Iout is larger than the first current threshold, when the largest value of the difference between the duty ratio Da and the duty ratio Dt is larger than the warning threshold, the deterioration detector 146 outputs the warning signal S3 corresponding to the characteristic lines 702a to 702c to the warning device 104. Also, in a case in which Da/Dt is proportional to the output current Iout in a range in which the output current Iout is larger than the first current threshold, the deterioration detector 146 outputs the stop signal S2 indicating "1" to cause the power supply circuit 101 to stop when the largest value of the difference between the duty ratio Da and the duty ratio Dt is larger than the stop threshold and outputs the stop signal S2 indicating "0" to output the duty ratio Da when the largest value of the difference between the duty ratio Da and the duty ratio Dt is not larger than the stop threshold.

The deterioration factor 904 may be omitted, as in FIG. 9.

The warning threshold and the stop threshold when the difference between the duty ratio Da and the duty ratio Dt is used may have values obtained by subtracting 100 from the warning threshold and the stop threshold for Da/Dt in FIG. 9. When the difference between the duty ratio Da and the duty ratio Dt is used, the number of divisions involved for the calculation is reduced by 1 compared with a case in which Da/Dt is used, and it is thus possible to reduce the amount of load applied to the CPU 301.

The deterioration detector 146 may perform failure diagnosis on the power supply circuit 101 to predict a failure, and a warning about the failure in the power supply circuit 101 may be displayed on the warning device 104. Such a configuration allows a user to replace the power supply circuit 101 before a failure occurs. Such a configuration also allows the user to perform planned preventive replacement of the power supply circuit 101 to reduce maintenance cost, thus making it possible to reduce the number of redundant power supply circuits 101. Also, by setting an appropriate warning threshold and an appropriate stop threshold in accordance with a deterioration factor, the deterioration detector 146 can detect deterioration of various power supply circuits 101, issue a warning, and report the deterioration factor.

The above-described embodiments are merely embodied examples for implementing the present disclosure, and it is to be understood that the technical scope of the present disclosure is not to be construed as being limited by the embodiments. That is, the present disclosure may be implemented in various modes without departing from the technical spirit or main features thereof.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A power-supply apparatus comprising:
   a power supply circuit to which an input voltage and an input current are input, configured to include a switching element to be controlled by a control signal so as to generate an output voltage and an output current;
   a memory; and
   a processor coupled to the memory and the processor configured to:
   calculate a first duty ratio of the control signal so that the output voltage approaches a target voltage;
   calculate a second duty ratio of the control signal for the switching element, based on the input voltage, the input current, the output voltage, and the output current;
   detect deterioration of the power supply circuit, based on the first duty ratio and the second duty ratio;
   generate the control signal of the first duty ratio when the power supply circuit has not deteriorated; and
   generate the control signal for stopping the power supply circuit when the power supply circuit has deteriorated,
   in a case in which a ratio of the first duty ratio to the second duty ratio is proportional to the output current in a range in which the output current is larger than a first current threshold, the processor is configured to generate the control signal for stopping the power supply circuit when the ratio of the first duty ratio to the second duty ratio is larger than a first stop threshold and generate the control signal of the first duty ratio when the ratio of the first duty ratio to the second duty ratio is smaller than or equal to the first stop threshold,
   in a case in which the ratio of the first duty ratio to the second duty ratio is inversely proportional to the output current in a range in which the output current is smaller than a second current threshold, the processor is configured to generate the control signal for stopping the power supply circuit when the ratio of the first duty ratio to the second duty ratio is larger than a second stop threshold and generate the control signal of the first duty ratio when the ratio of the first duty ratio to the second duty ratio is smaller than or equal to the second stop threshold, and
   in a case in which a variation in the ratio of the first duty ratio to the second duty ratio with respect to the output current is within a threshold range, the processor is configured to generate the control signal for stopping the power supply circuit when the ratio of the first duty ratio to the second duty ratio is larger than a third stop threshold and generate the control signal of the first duty ratio when the ratio of the first duty ratio to the second duty ratio is smaller than or equal to the third stop threshold.

2. The power-supply apparatus according to claim 1, wherein the processor is configured to:
   determine a loss power by subtracting a product of the output voltage and the output current from a product of the input voltage and the input current,
   determine a loss resistance corresponding to the loss power by dividing the loss power by a square of the output current, and
   calculate the second duty ratio, based on the loss resistance and the input voltage, the output voltage, and the output current.

3. The power-supply apparatus according to claim 2, wherein, when the output current is smaller than a current threshold, the loss resistance is set to a specific value.

4. The power-supply apparatus according to claim 2, wherein the processor is configured to:
   determine a load resistance by dividing the output voltage by the output current,
   determine a sum of the load resistance and the loss resistance,
   determine a product of the sum and the output current,
   divide the product by the input voltage, and
   calculate the second duty ratio based on a result of dividing the product.

5. The power-supply apparatus according to claim 4, wherein the processor is configured to calculate the second duty ratio by multiplying the result of dividing the product by a turns ratio of a transformer in the power supply circuit.

6. The power-supply apparatus according to claim 1, wherein the processor is configured to
   generate the control signal for stopping the power supply circuit, when a ratio of the first duty ratio to the second duty ratio is larger than a stop threshold, and
   generate the control signal of the first duty ratio, when the ratio of the first duty ratio to the second duty ratio is smaller than or equal to the stop threshold.

7. The power-supply apparatus according to claim 1, wherein the processor is configured to generate a warning signal, when a ratio of the first duty ratio to the second duty ratio is larger than a warning threshold.

8. The power-supply apparatus according to claim 1,
   wherein, in a case in which a ratio of the first duty ratio to the second duty ratio is proportional to the output current in a range in which the output current is larger than a first current threshold, the processor is configured to generate a first warning signal when the ratio of the first duty ratio to the second duty ratio is larger than a first warning threshold;
   wherein, in a case in which the ratio of the first duty ratio to the second duty ratio is inversely proportional to the output current in a range in which the output current is smaller than a second current threshold, the processor is configured to generate a second warning signal when the ratio of the first duty ratio to the second duty ratio is larger than a second warning threshold; and
   wherein, in a case in which a variation in the ratio of the first duty ratio to the second duty ratio with respect to the output current is within a threshold range, the processor is configured to generate a third warning signal when the ratio of the first duty ratio to the second duty ratio is larger than a third warning threshold.

9. The power-supply apparatus according to claim 1,
   wherein, in a case in which a gradient of a ratio of the first duty ratio to the second duty ratio with respect to the output current is larger than a first positive value, the processor is configured to generate the control signal for stopping the power supply circuit when the ratio of the first duty ratio to the second duty ratio is larger than a first stop threshold and generate the control signal of the first duty ratio when the ratio of the first duty ratio to the second duty ratio is smaller than or equal to the first stop threshold;
   wherein, in a case in which the gradient of the ratio of the first duty ratio to the second duty ratio with respect to the output current is smaller than a first negative value, the processor is configured to generate the control signal for stopping the power supply circuit when the ratio of the first duty ratio to the second duty ratio is larger than a second stop threshold and generate the control signal of the first duty ratio when the ratio of the first duty ratio to the second duty ratio is smaller than or equal to the second stop threshold; and
   wherein, in a case in which the gradient of the ratio of the first duty ratio to the second duty ratio with respect to the output current is smaller than or equal to the first positive value and is larger than or equal to the first negative value, the processor is configured to generate the control signal for stopping the power supply circuit when the ratio of the first duty ratio to the second duty ratio is larger than a third stop threshold and generate the control signal of the first duty ratio when the ratio of the first duty ratio to the second duty ratio is not larger than the third stop threshold.

10. The power-supply apparatus according to claim 1,
    wherein, in a case in which a gradient of a ratio of the first duty ratio to the second duty ratio with respect to the output current is larger than a first positive value, the processor is configured to generate a first warning signal when the ratio of the first duty ratio to the second duty ratio is larger than a first warning threshold;
    wherein, in a case in which the gradient of the ratio of the first duty ratio to the second duty ratio with respect to the output current is smaller than a first negative value, the processor is configured to generate a second warning signal when the ratio of the first duty ratio to the second duty ratio is larger than a second warning threshold; and
    wherein, in a case in which the gradient of the ratio of the first duty ratio to the second duty ratio with respect to the output current is smaller than or equal to the first positive value and is larger than or equal to the first negative value, the processor is configured to generate a third warning signal when the ratio of the first duty ratio to the second duty ratio is larger than a third warning threshold.

11. The power-supply apparatus according to claim 1,
    wherein, in a case in which a ratio of the first duty ratio to the second duty ratio is proportional to the output current in a range in which the output current is larger than a first current threshold, the processor is configured to generate the control signal for stopping the power supply circuit when the gradient of the ratio of the first duty ratio to the second duty ratio with respect to the output current is larger than a first stop threshold and generate the control signal of the first duty ratio when the gradient of the ratio of the first duty ratio to the second duty ratio with respect to the output current is not larger than the first stop threshold;
    wherein, in a case in which the ratio of the first duty ratio to the second duty ratio is inversely proportional to the output current in a range in which the output current is smaller than a second current threshold, the processor is configured to generate the control signal for stopping the power supply circuit when the gradient of the ratio of the first duty ratio to the second duty ratio with respect to the output current is smaller than a second stop threshold and generate the control signal of the first duty ratio when the gradient of the ratio of the first duty ratio to the second duty ratio with respect to the output current is smaller than or equal to the second stop threshold; and
    wherein, in a case in which a variation in the ratio of the first duty ratio to the second duty ratio with respect to the output current is within a threshold range, the processor is configured to generate the control signal for stopping the power supply circuit when the ratio of the first duty ratio to the second duty ratio is larger than a third stop threshold and generate the control signal of the first duty ratio when the ratio of the first duty ratio to the second duty ratio is smaller than or equal to the third stop threshold.

12. The power-supply apparatus according to claim 1, wherein, in a case in which a ratio of the first duty ratio to the second duty ratio is proportional to the output current in a range in which the output current is larger than a first current threshold, the processor is configured to generate a first warning signal when the gradient of the ratio of the first duty ratio to the second duty ratio with respect to the output current is larger than a first warning threshold;

wherein, in a case in which the ratio of the first duty ratio to the second duty ratio is inversely proportional to the output current in a range in which the output current is smaller than a second current threshold, the processor is configured to generate a second warning signal when the gradient of the ratio of the first duty ratio to the second duty ratio with respect to the output current is smaller than a second warning threshold; and wherein, in a case in which a variation in the ratio of the first duty ratio to the second duty ratio with respect to the output current is within a threshold range, the processor is configured to generate a third warning signal when the ratio of the first duty ratio to the second duty ratio is larger than a third warning threshold.

13. The power-supply apparatus according to claim 1, wherein, in a case in which a gradient of a ratio of the first duty ratio to the second duty ratio with respect to the output current is larger than a first positive value, the processor is configured to generate the control signal for stopping the power supply circuit when the gradient of the ratio of the first duty ratio to the second duty ratio with respect to the output current is larger than a first stop threshold and generate the control signal of the first duty ratio when the gradient of the ratio of the first duty ratio to the second duty ratio with respect to the output current is smaller than or equal to the first stop threshold;

wherein, in a case in which the gradient of the ratio of the first duty ratio to the second duty ratio with respect to the output current is smaller than a first negative value, the processor is configured to generate the control signal for stopping the power supply circuit when the gradient of the ratio of the first duty ratio to the second duty ratio with respect to the output current is smaller than a second stop threshold and generate the control signal of the first duty ratio when the gradient of the ratio of the first duty ratio to the second duty ratio with respect to the output current is smaller than or equal to the second stop threshold; and wherein, in a case in which a gradient of the ratio of the first duty ratio to the second duty ratio with respect to the output current is smaller than or equal to the first positive value and is larger than or equal to the first negative value, the processor is configured to generate the control signal for stopping the power supply circuit when the ratio of the first duty ratio to the second duty ratio is larger than a third stop threshold and generate the control signal of the first duty ratio when the ratio of the first duty ratio to the second duty ratio is smaller than or equal to the third stop threshold.

14. The power-supply apparatus according to claim 1, wherein, in a case in which a gradient of a ratio of the first duty ratio to the second duty ratio with respect to the output current is larger than a first positive value, the processor is configured to generate a first warning signal when the gradient of the ratio of the first duty ratio to the second duty ratio with respect to the output current is larger than a first warning threshold;

wherein, in a case in which the gradient of the ratio of the first duty ratio to the second duty ratio with respect to the output current is smaller than a first negative value, the processor is configured to generate a second warning signal when the gradient of the ratio of the first duty ratio to the second duty ratio with respect to the output current is smaller than a second warning threshold; and wherein, in a case in which the gradient of the ratio of the first duty ratio to the second duty ratio with respect to the output current is smaller than or equal to the first positive value and is larger than or equal to the first negative value, the processor is configured to generate a third warning signal when the ratio of the first duty ratio to the second duty ratio is larger than a third warning threshold.

15. The power-supply apparatus according to claim 1, wherein the processor is configured to generate the control signal for stopping the power supply circuit when a difference between the first duty ratio and the second duty ratio is larger than a stop threshold and generate the control signal of the first duty ratio when the difference between the first duty ratio and the second duty ratio is smaller than or equal to the stop threshold.

16. The power-supply apparatus according to claim 1, wherein, when a difference between the first duty ratio and the second duty ratio is larger than a warning threshold, the processor is configured to generate a warning signal.

17. A power-supply method to control a power supply circuit to which an input voltage and an input current are input, configured to include a switching element to be controlled by a control signal so as to generate an output voltage and an output current, the power-supply method comprising;

calculating a first duty ratio of the control signal so that the output voltage approaches a target voltage;

calculating a second duty ratio of the control signal for the switching element, based on the input voltage, the input current, the output voltage, and the output current;

detecting deterioration of the power supply circuit, based on the first duty ratio and the second duty ratio;

generating the control signal of the first duty ratio when the power supply circuit has not deteriorated; and generating the control signal for stopping the power supply circuit when the power supply circuit has deteriorated, by a processor, in a case in which a ratio of the first duty ratio to the second duty ratio is proportional to the output current in a range in which the output current is larger than a first current threshold, the processor is configured to generate the control signal for stopping the power supply circuit when the ratio of the first duty ratio to the second duty ratio is larger than a first stop threshold and generate the control signal of the first duty ratio when the ratio of the first duty ratio to the second duty ratio is smaller than or equal to the first stop threshold, in a case in which the ratio of the first duty ratio to the second duty ratio is inversely proportional to the output current in a range in which the output current is smaller than a second current threshold, the processor is configured to generate the control signal for stopping the power supply circuit when the ratio of the first duty ratio to the second duty ratio is larger than a second stop threshold and generate the control signal of the first duty ratio when the ratio of the first duty ratio to the second duty ratio is smaller than or equal to the second stop threshold, and in a case in which a variation in the ratio of the first duty ratio to the second duty ratio with respect to the output current is within a threshold range, the processor is configured to generate the control signal for stopping the power supply circuit when the ratio of the first duty ratio to the second duty ratio is larger than a third stop threshold and generate the control signal of the first duty ratio when the ratio of the first duty ratio to the second duty ratio is smaller than or equal to the third stop threshold.

18. A computer-readable non-transitory recording medium storing a program that causes a computer to execute a procedure to control a power supply circuit to which an input voltage and an input current are input, configured to include a switching element to be controlled by a control signal so as to generate an output voltage and an output current, the procedure comprising:

calculating a first duty ratio of the control signal so that the output voltage approaches a target voltage;

calculating a second duty ratio of the control signal for the switching element, based on the input voltage, the input current, the output voltage, and the output current;

detecting deterioration of the power supply circuit, based on the first duty ratio and the second duty ratio;

generating the control signal of the first duty ratio when the power supply circuit has not deteriorated; and generating the control signal for stopping the power supply circuit when the power supply circuit has deteriorated, in a case in which a ratio of the first duty ratio to the second duty ratio is proportional to the output current in a range in which the output current is larger than a first current threshold, the processor is configured to generate the control signal for stopping the power supply circuit when the ratio of the first duty ratio to the second duty ratio is larger than a first stop threshold and generate the control signal of the first duty ratio when the ratio of the first duty ratio to the second duty ratio is smaller than or equal to the first stop threshold, in a case in which the ratio of the first duty ratio to the second duty ratio is inversely proportional to the output current in a range in which the output current is smaller than a second current threshold, the processor is configured to generate the control signal for stopping the power supply circuit when the ratio of the first duty ratio to the second duty ratio is larger than a second stop threshold and generate the control signal of the first duty ratio when the ratio of the first duty ratio to the second duty ratio is smaller than or equal to the second stop threshold, and in a case in which a variation in the ratio of the first duty ratio to the second duty ratio with respect to the output current is within a threshold range, the processor is configured to generate the control signal for stopping the power supply circuit when the ratio of the first duty ratio to the second duty ratio is larger than a third stop threshold and generate the control signal of the first duty ratio when the ratio of the first duty ratio to the second duty ratio is smaller than or equal to the third stop threshold.

* * * * *